United States Patent
Hamada

(10) Patent No.: US 9,027,613 B2
(45) Date of Patent: May 12, 2015

(54) HEAVY DUTY TIRE

(75) Inventor: Takeshi Hamada, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 1134 days.

(21) Appl. No.: 13/021,096

(22) Filed: Feb. 4, 2011

(65) Prior Publication Data

US 2011/0226397 A1    Sep. 22, 2011

(30) Foreign Application Priority Data

Mar. 19, 2010   (JP) ................................. 2010-064673

(51) Int. Cl.
  *B60C 11/12*    (2006.01)
  *B60C 11/11*    (2006.01)
  *B60C 11/13*    (2006.01)

(52) U.S. Cl.
  CPC ................. *B60C 11/12* (2013.01); *B60C 11/11* (2013.01); *B60C 11/1369* (2013.01); *B60C 2011/1213* (2013.01); *B60C 2011/1231* (2013.01); *B60C 2200/06* (2013.01)

(58) Field of Classification Search
  CPC .... B60C 11/11; B60C 11/12; B60C 11/1236; B60C 11/1272; B60C 2011/1213; B60C 11/1231; B60C 11/1218; B60C 11/1259; B60C 11/1263; B60C 11/1369; B60C 2200/06
  USPC ............... 152/209.18, 209.25, 209.1, 209.15, 152/209.26, 209.27, 209.28
  See application file for complete search history.

(56) References Cited

U.S. PATENT DOCUMENTS

| | | | | |
|---|---|---|---|---|
| 4,705,088 | A * | 11/1987 | Ghilardi .................... | 152/209.18 |
| 6,003,575 | A * | 12/1999 | Koyama et al. .......... | 152/209.18 |
| 6,170,546 | B1 * | 1/2001 | Koyama et al. .......... | 152/209.18 |
| 7,025,100 | B2 * | 4/2006 | Kimishima ............... | 152/209.18 |
| 7,954,527 | B2 * | 6/2011 | Ohara ....................... | 152/209.17 |
| 8,474,496 | B2 * | 7/2013 | Yamakawa ............... | 152/209.15 |
| 2003/0226629 | A1 * | 12/2003 | Kimishima ............... | 152/209.18 |

(Continued)

FOREIGN PATENT DOCUMENTS

| | | | | |
|---|---|---|---|---|
| EP | 0469816 | A2 * | 7/1991 | .............. B60C 11/11 |
| EP | 0823340 | A1 * | 2/1998 | .............. B60C 11/12 |

(Continued)

*Primary Examiner* — Seyed Masoud Malekzadeh

(74) *Attorney, Agent, or Firm* — Birch, Stewart, Kolasch & Birch, LLP

(57) ABSTRACT

A heavy duty tire comprises a tread portion provided with tread blocks each provided in the ground contact surface thereof with a single zigzag sipe. A ratio A/B of a block length (A) which is the circumferential length of the block measured along a straight line passing through the centroid of the ground contact surface to a maximum block width (B) which is the axial distance between the axial extreme ends of the ground contact surface is 0.8 to 1.7. The zigzag sipe is disposed within a central region which is defined as extending from the centroid of the ground contact surface towards each side in the tire circumferential direction by 25% of the block length (A). The zigzag sipe is composed of a pair of major straight segments extending axially inwardly from both sides of in the tire axial direction of the block, and a minor straight segment extending between the inner ends of the respective major straight segments, so that the circumferential distance between the circumferential extreme ends of the sipe is in a range of from 10 to 35% of the block length (A).

5 Claims, 6 Drawing Sheets

(56) References Cited

U.S. PATENT DOCUMENTS

2008/0053584 A1* 3/2008 Ohara .................. 152/209.25
2008/0053585 A1* 3/2008 Ohara .................. 152/209.25

FOREIGN PATENT DOCUMENTS

| EP | 2159081 A1 * | 3/2010 | ............. B60C 11/04 |
| JP | 2007-153275 A | 6/2007 | |

* cited by examiner

Tire equator side

Tread edge side

HEAVY DUTY TIRE

BACKGROUND OF THE INVENTION

The present invention relates to a pneumatic tire, more particularly to a configuration of a tread block with a zigzag sipe capable of improving heel-and-toe wear and wet traction and suitable for heavy duty tires.

In general, heavy duty tires such as truck/bus tires are provided with deep tread grooves in order to prolong the tread weal life and provide good wet performance. In the case of tread blocks divided by such deep tread grooves, there is a tendency that, at the time of traction and braking, deformation or movement of the block in the tire circumferential direction increases, and as a result, partial wear so called heel-and-toe wear occurs at the heel-side edge and toe-side edge of the block. In particular, heel-and-toe wear is significant problem for the tires mounted on drive wheels of a tractor rotated with big drive power.

It is conceivable to decrease the deformation or movement by increasing the circumferential length of the block to increase the circumferential rigidity. However, the increase in the circumferential length means decrease in the number of the axial grooves which have a problem with wet traction on the wet roads.

SUMMARY OF THE INVENTION

It is therefore, an object of the present invention to provide a heavy duty tire in which the heel-and-toe wear is improved without deteriorating the wet traction.

According to the present invention, a heavy duty tire comprises a tread portion provided with tread blocks each provided in its ground contact surface with a zigzag sipe, wherein a ratio A/B of a block length (A) which is the circumferential length of the block measured along a straight line passing through the centroid of the ground contact surface in parallel to the tire circumferential direction to a maximum block width (B) which is the axial distance between the axial extreme ends of the ground contact surface is 0.8 to 1.7, and the zigzag sipe is disposed within a central region which is defined as extending from the centroid of the ground contact surface towards each side in the tire circumferential direction by 25% of the block length (A), and the zigzag sipe is composed of
a pair of major straight segments extending axially inwardly from both sides of in the tire axial direction of the block, and a minor straight segment extending between the inner ends of the respective major straight segments, so that the circumferential distance between the circumferential extreme ends of the sipe is in a range of from 10 to 35% of the block length (A).

As the ratio A/B is set in the range of 0.8 to 1.7, the rigidity of the block can be retained or increased, which helps to reduce the heel-and-toe wear. Further, since the zigzag sipe is formed within the central region, the sipe can improve the wet traction. Furthermore, the sipe can even the rigidity of the surface of the block, therefore the slippage between the ground contacting surface and the road surface is evened and the heel-and-toe wear is improved.

In this application including specification and claims, various dimensions, positions and the like of the tire refer to those under the normally inflated unloaded condition of the tire unless otherwise noted.

The undermentioned tread width TW is the axial distance between the tread edges Te measured in a normally inflated unloaded condition of the tire. The tread edges Te are the axial outermost edges of the ground contacting patch (camber angle=0) in a normally inflated loaded condition.

The normally inflated unloaded condition is such that the tire is mounted on a standard wheel rim and inflate to a standard pressure but loaded with no tire load.

The normally inflated loaded condition is such that the tire is mounted on the standard wheel rim and inflate to the standard pressure and loaded with the standard tire load.

The standard wheel rim is a design rim recommended by the tire manufacturer or a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are a designed maximum air pressure and a designed maximum tire load recommended by the tire manufacturer or the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various cold Inflation Pressures" table in TRA or the like. The standard load is the "maximum load capacity" in JATMA, the "Load Capacity" in ETRTO, the maximum value given in the above-mentioned table in TRA or the like.

DESCRIPTION OF THE PREFERRED EMBODIMENT

Figure 1:
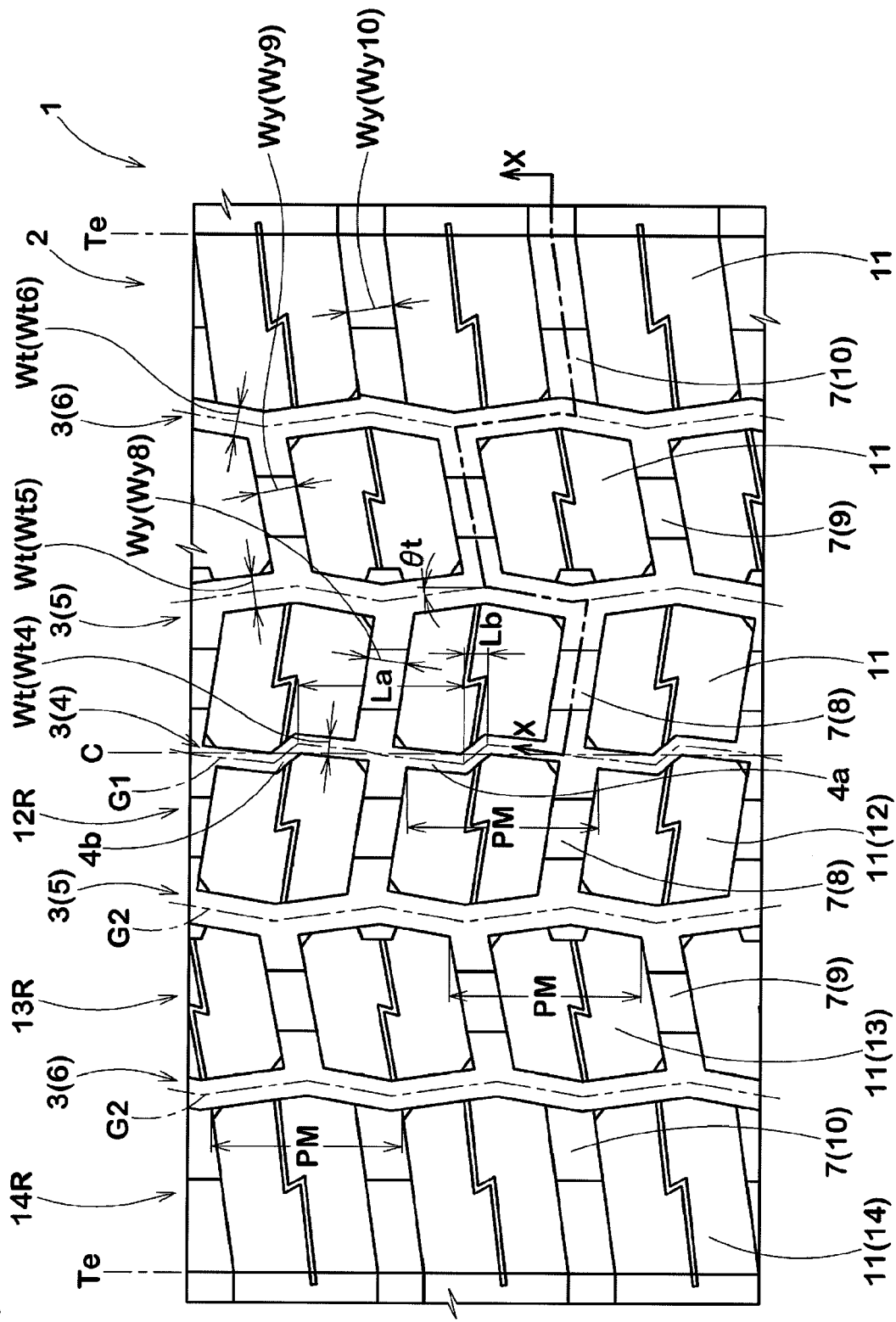
FIG. 1 is a developed partial view of a tread portion of a heavy duty tire according to the present invention.

Embodiments of the present invention will now be described in detail in conjunction with the accompanying drawings.

Heavy duty tire 1 according to the present invention comprises a tread portion 2, a pair of bead portions, a pair of sidewall portions, a carcass extending between the bead portions, and a tread reinforcing belt disposed radially outside the carcass in the tread portion 2 as usual.

The tread portion 2 is provided with circumferential grooves 3 extending continuously in the tire circumferential direction, and axial grooves 7 intersecting the circumferential grooves 3 so as to form a plurality of tread blocks 11.

The tread portion 2 may be provided with a circumferentially continuously extending rib in addition to the tread blocks 11. But, in this embodiment, as shown in FIG. 1, the tread portion 2 is provided with the tread blocks 11 only.

The circumferential grooves 3 include a crown circumferential groove 4 extending along the tire equator C, a pair of middle circumferential grooves 5 disposed one on each side of the tire equator C, and a pair of shoulder circumferential grooves 6 disposed axially outside the middle circumferential grooves 5 and axially inside the tread edges Te.

In this embodiment, all of the circumferential grooves 4, 5 and 6 are formed as zigzag grooves in order to increase the axial component of the groove edges to improve the traction performance.

The crown circumferential groove 4 is made up of alternating mildly-inclined parts 4a and steeply-inclined parts 4b, wherein
the mildly-inclined part 4a has a longer circumferential length and a smaller inclination angle θ1 with respect to the tire circumferential direction, and
the steeply-inclined part 4b has a shorter circumferential length than that of the mildly-inclined part 4a and a larger inclination angle θ2 than the mildly-inclined part 4a with respect to the tire circumferential direction.

Such zigzag configuration has advantages such that wet traction is improved by the steeply-inclined parts 4b while drainage in the tread center portion is promoted by the mildly-inclined parts 4a. For this reason, it is preferred that the circumferential length La of the mildly-inclined part 4a is 4 to 7 times the circumferential length Lb of the steeply-inclined part 4b, the angle θ1 of the mildly-inclined part 4a is 3 to 10 degrees, and the angle θ2 of the steeply-inclined parts 4b is 35 to 45 degrees.

The middle circumferential grooves 5 is made up of alternating first oblique parts 5a and second oblique parts 5b which are inclined oppositely with respect to the tire circumferential direction.

The shoulder circumferential groove 6 is made up of alternating first oblique parts 6a and second oblique parts 6b which are inclined oppositely with respect to the tire circumferential direction.

The oblique parts 5a and 5b and the oblique parts 6a and 6b have substantially same circumferential lengths and substantially same inclinations angles θ3. But, the phase of the zigzag is shifted by about ½ cycle or pitch between the axially adjacent middle circumferential groove 5 and shoulder circumferential groove 6, The angles θ3 are preferably set in a range of from 7 to 15 degrees in order to balance the improvement in traction with the deterioration of drainage.

In this embodiment, the widths Wt of the circumferential grooves 3 are not less than 4 mm, preferably not less than 6 mm, but not more than 11 mm, preferably not more than 9 mm, and the depths Dt of the circumferential grooves 3 are not less than 10 mm, preferably not less than 18 mm, more preferably not less than 19 mm, but not more than 25 mm, preferably not more than 24 mm.

In order to provide rigidity in the tread crown portion where the ground pressure becomes higher during straight running, the depth Dt4 of the crown circumferential groove 4 is preferably set in a range of not less than 10 mm, more preferably not less than 12 mm, but not more than 17 mm, more preferably not more than 15 mm, and
the width Wt4 of the crown circumferential groove 4 is preferably set in a range of not less than 3 mm, more preferably not less than 4 mm, but not more than 8 mm, more preferably not more than 7 mm.

In view of drainage, the depth Dt5 of the middle circumferential groove 5 and the depth Dt6 of the shoulder circumferential groove 6 are set to be more than the depth Dt4 of the crown circumferential groove 4, and
the width Wt5 of the middle circumferential grooves 5 and the width Wt6 of the shoulder circumferential groove 6 are more than the width Wt4 of the crown circumferential groove 4, and preferably the depth Dt5 and the depth Dt6 are not less than 18 mm, more preferably not less than 19 mm, but not more than 25 mm, more preferably not more than 24 mm, and
preferably the width Wt5 and the width Wt6 are not less than 4 mm, more preferably not less than 6 mm, but not more than 11 mm, more preferably not more than 9 mm.

As to the positions of the circumferential grooves 3, the center line G1 of the crown circumferential groove 4 extends along the tire equator C while intersecting the tire equator C at two points per one zigzag cycle.
The axial distance L2 of the center line G2 (amplitude center) of each of the middle circumferential grooves 5 from the tire equator C is preferably 12 to 18% of the tread width TW.
The axial distance L3 of the center line G3 (amplitude center) of each of the shoulder circumferential grooves 6 from the adjacent tread edge Te is preferably 15 to 21% of the tread width TW.

The above-mentioned axial grooves 7 include crown axial grooves 8 extending to connect the crown circumferential groove 4 with the middle circumferential grooves 5, middle axial grooves 9 extending to connect the middle circumferential grooves 5 with the shoulder circumferential grooves 6, and shoulder axial grooves 10 extending from the shoulder circumferential grooves 6 to the tread edged Te.

The crown axial grooves 8, middle axial grooves 9 and shoulder axial grooves 10 are arranged at the same pitches PM in the tire circumferential direction.

By the axial grooves 7 and the circumferential grooved 3, the tread portion 2 is divided into six rows 12R, 13R and 14R of tread blocks 11, namely, two crown block rows 12R of crown blocks 12 between the crown circumferential groove 4 and middle circumferential grooves 5, two middle block rows 13R of middle blocks 13 between the middle circumferential grooves 5 and the shoulder circumferential grooves 6, and two shoulder block rows 14R of shoulder blocks 14 between the shoulder circumferential grooves 6 and the tread edges Te.

In this embodiment, the middle axial grooves 9 extend from the tread-edge-side zigzag corners 5y of the middle circumferential grooves 5 to the tire-equator-side zigzag corners 6x of the shoulder circumferential grooves 6.
The shoulder axial grooves 10 extend from the tread-edge-side zigzag corners 6y of the shoulder circumferential grooves 6 to the tread edges Te. Thereby, each of the middle blocks 13 and shoulder blocks 14 is gradually increased in the axial width from its circumferential ends toward circumferential center.

In this embodiment, the crown axial grooves 8 extend from the intermediate positions 4y of the mildly-inclined parts 4a of the crown circumferential groove 4 to the tire-equator-side zigzag corners 5x of the middle circumferential grooves 5.

Figure 2:
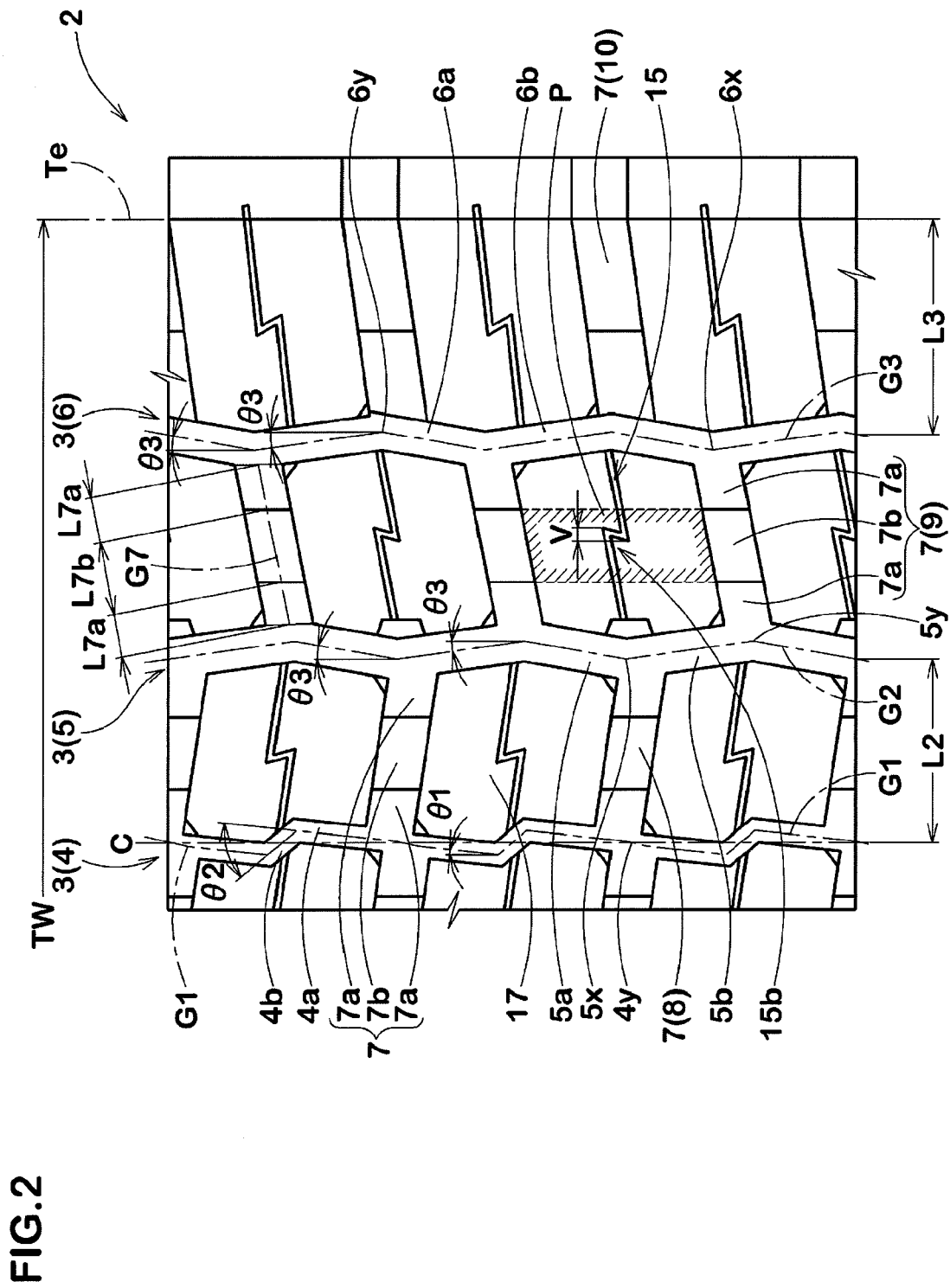
FIG. 2 is an enlarged partial view of the tread portion.
Figure 3:
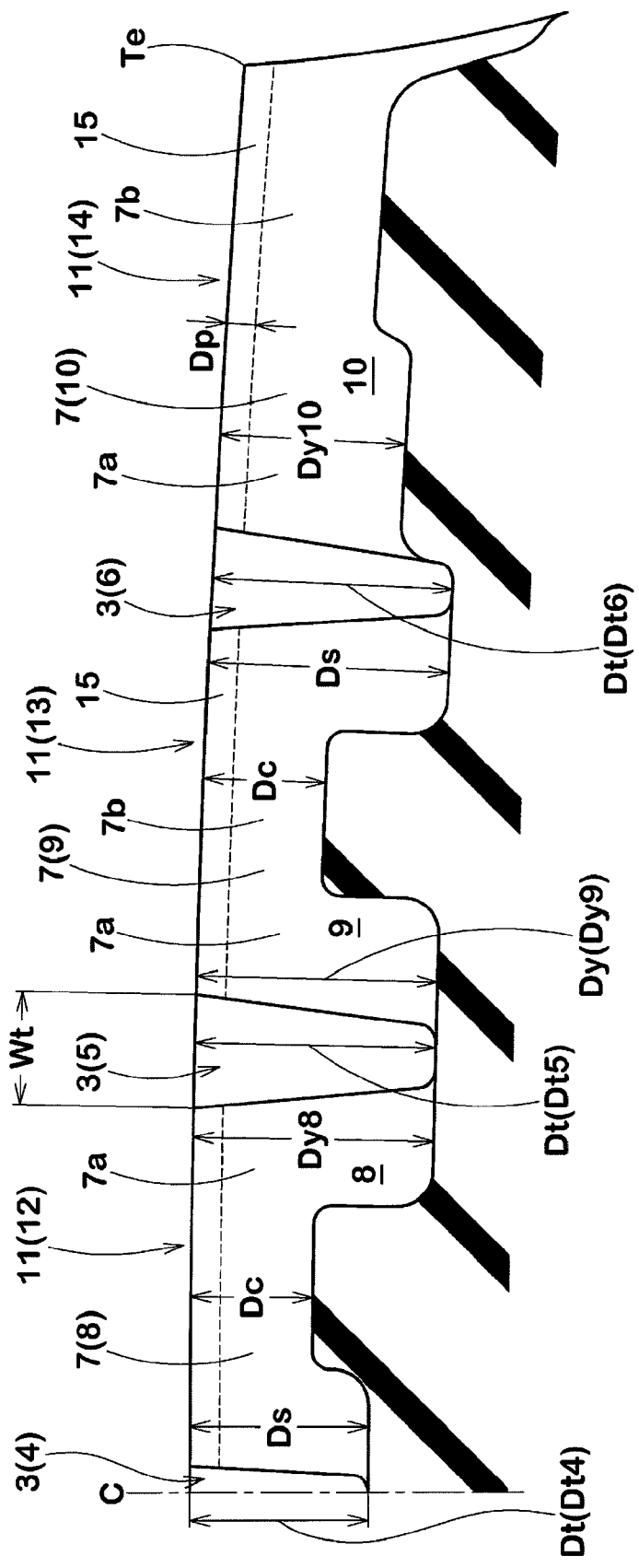
FIG. 3 is a cross sectional view of the tread portion taken along line X-X of FIG. 1.

Therefore, in each of the crown blocks 12, the axially outer longitudinal block edge of the ground contact surface 17 facing the middle circumferential groove 5 has an axially outwardly convexed v-shaped configuration, and
the axially inner longitudinal block edge of the ground contact surface 17 facing the crown circumferential groove 4 has a zigzag configuration defined by two parallel straight segments and one shorter straight segment therebetween.
Thereby, the axial width of the crown block 12 is gradually increased from one side in the tire circumferential direction (upper side in FIG. 2) towards the center, but substantially constant from the other side in the tire circumferential direction (lower side in FIG. 2) towards the center.

The widths Wy of the axial grooves 7 are set in a range of not less than 8 mm, more preferably not less than 9 mm, but not more than 12 mm, more preferably not more than 11 mm in order to balance drainage with wet traction.

In this embodiment, in order to discharge water existing between the tread portion and the road surface toward the tread edge sides, the widths Wy are gradually increased from the tire equator towards the tread edge sides. Specifically, the width Wy8 of the crown axial grooves 8, the width Wy9 of the middle axial grooves 9, and the width Wy10 of the shoulder axial grooves 10 are designed such that Wy8<Wy9<Wy10.

In order to avoid decrease in the rigidity in the shoulder portions where the ground pressure becomes higher during cornering, it is preferred that the depth Dy10 of the shoulder axial grooves 10 is less than the depths Dy8 and Dy9 of the crown axial grooves 8 and middle axial grooves 9.

All of the axial grooves 7 are formed as straight grooves inclined at small angles with respect to the tire axial direction in order to increase the axial component of the groove edges. Therefore, drainage towards the tread edges Te is enhanced while improving the traction performance and steering stability.

In this embodiment, the crown axial grooves 8 on both sides of the tire equator are inclined to one direction (in FIG. 1, diagonally right down), and
the middle axial grooves 9 and shoulder axial grooves 10 on both sides of the tire equator are inclined to one direction oppositely to the crown axial grooves 8 (in FIG. 1, diagonally left down). Thereby, the tread portion is provided with a bidirectional tread pattern.

The width Wt of each of the circumferential grooves 3 and the width Wy of each of the axial grooves 7 may be variable along groove length, but in this embodiment, they are constant.

Figure 4:
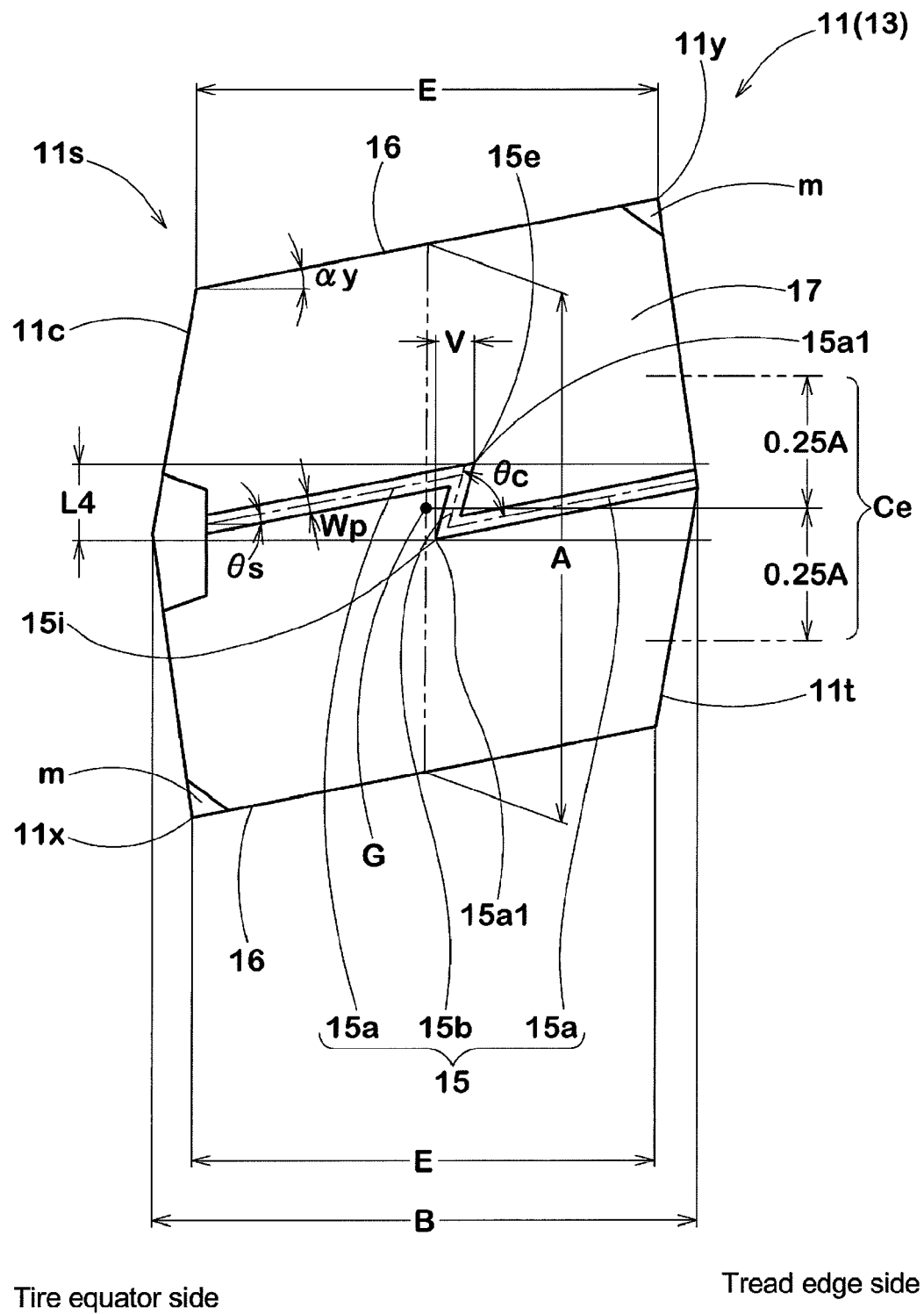
FIG. 4 is a top view of the middle block.
Figure 5:
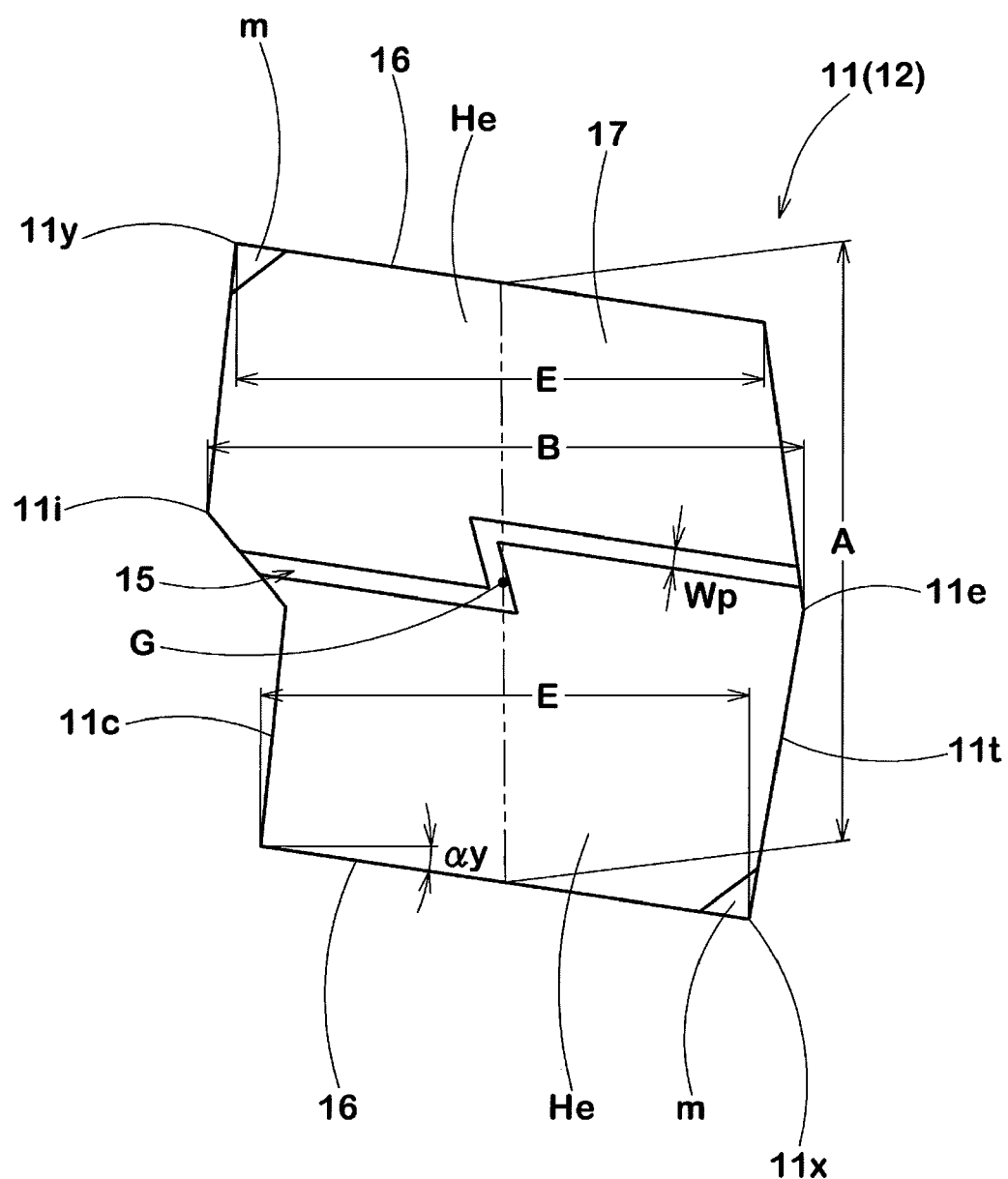
FIG. 5 is a top view of the crown block.
Figure 6:
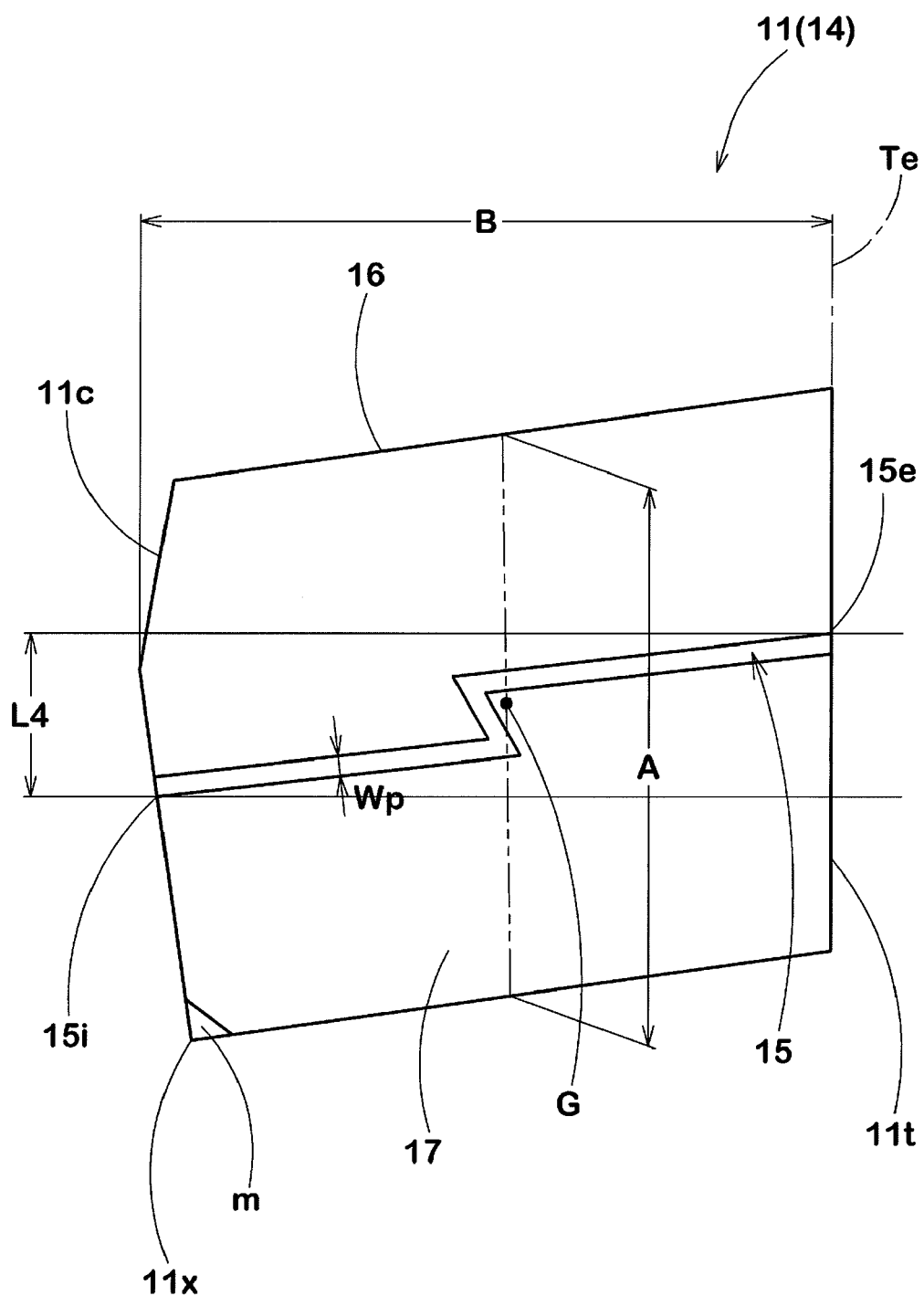
FIG. 6 is a top view of the shoulder block.

Some of the tread blocks 11, preferably at least all of the middle blocks 13, in this embodiment all of the tread blocks 11 are as shown in FIG. 1 and FIG. 4, designed such that the ratio (A/B) of a block length (A) which is the circumferential length of the block measured along a straight line passing through the centroid G of the ground contact surface 17 in parallel with the tire circumferential direction to a maximum block width (B) which is the axial distance between the axial extreme ends 11e and 11i of the ground contact surface 17 is set in a range of not less than 0.8, preferably not less than 0.9, but not more than 1.7, preferably not more than 1.6. If the ratio A/B is less than 0.8, the block 11 becomes long sideways, therefore, there is a tendency that the deformation or movement in the tire circumferential direction of the block at the time of traction and braking increases and heel-and-toe wear occurs. If the ratio A/B is more than 1.7, the effect of the axial component of the block edge decreases and it becomes difficult to obtain necessary wet traction.

The tread blocks 11 having the above-mentioned ratio (A/B) are each provided with a single sipe 15 within its central region Ce in the tire circumferential direction in order to decrease the rigidity in the central region Ce to thereby the rigidity difference between the central region Ce and circumferential edge regions He is decreased, and the slippage between the ground contacting surface and the road surface is evened and the heel-and-toe wear is improved.

The central region Ce is a region extending from the centroid of the ground contact surface 17 towards each side in the tire circumferential direction by 25% of the block length (A), Accordingly, there is a passivity that the tread blocks 11 include blocks 11s with the sipe 15 and blocks 11n without the sipe. In this embodiment, all of the tread blocks 11 are the blocks 11s with the sipe 15.

The sipe 15 is a cut or very narrow groove whose groove width Wp is about 0.5 to 1.5 mm.

The sipe 15 is composed of a pair of major straight segments 15a extending from both sides 11c and 11t in the tire axial direction of the block 11 towards the centroid G, and a minor straight segment 15b extending between the inner ends 15a1 of the respective major straight segments 15a. Thus, the sipe 15 is zigzag and its edge length is increased in comparison with a straight sipe. This is effective for improving the wet traction.

The major straight segments 15a are parallel with each other, and the angles θc between the minor straight segment 15b and the major straight segments 15a are less than 90 degrees, preferably not more than 70 degrees, more preferably not more than 65 degrees, but preferably not less than 50 degrees, more preferably not less than 55 degrees. As a result, the sipe 15 has a Z-shaped configuration.

As the sipe 15 has a z-shaped configuration, the portions of the block divided by the sipe 15 can engage with each other and their relative motion is reduced even if subjected to a shearing force in the sipe direction. As a result, local wear in the central region Ce can be prevented.

The major straight segments 15a may be parallel with the tire axial direction. But, in this embodiment, the major straight segments 15a are inclined with respect to the tire axial direction so that the edges of the sipe 15 include a certain degree of circumferential component to provide good wet traction during cornering in addition to straight running. From this standpoint, the angle θs of the major straight segments 15a with respect to the tire axial direction is preferably not less than 3 degrees, more preferably not less than 5 degrees, but preferably not more than 35 degrees, more preferably not more than 30 degrees.

If more than 35 degrees, weak acute angle corners at which uneven wear is liable to occur are formed between the major straight segments 15a and the circumferential grooves, and it becomes difficult to prevent heel-and-toe wear.

In the case that the transverse block edge 16 of the ground contact surface 17 of the block 11 facing the axial groove 7 is inclined with respect to the tire axial direction, it is preferable that the major straight segments 15a are inclined to the same direction as the transverse block edge 16 with respect to the tire axial direction.

More preferably, the angle θs of the major straight segments 15a is equal to the angle αy of the transverse block edge 16.

The circumferential distance L4 between the circumferential extreme ends 15e and 15i of the sipe 15 (namely, the circumferential extent of the sipe 15) is set in a range of not less than 10%, preferably not less than 12%, but not more than 35%, preferably not more than 25% of the block length (A). If less than 10%, the rigidity of the central region Ce of the block 11 can not be effectively decreased, therefore, it becomes difficult to control the heel-and-toe wear.

If more than 35%, the rigidity of the block 11 in the central region Ce is excessively decreased, and uneven wear is liable occur in the central region Ce.

The depth Dp of the sipe 15 is set in a range of not less than 10%, preferably not less than 12%, but not more than 30%, preferably not more than 25% of the depth Dt of the circumferential groove 3. Here, the depth Dt of the circumferential groove 3 means the maximum depth of one or two circumferential grooves 3 adjacent to the sipe 15. If two circumferential grooves 3 having different maximum depths are adjacent to the sipe 15, the deeper one is used.

If less than 10%, the rigidity of the central region Ce can not be decreased. If more than 30%, the rigidity of the central region Ce decreases too much, and thereby uneven wear is liable to occur.

The axial groove 7 which extends between the circumferential grooves 3 to define the blocks 11s with the sipe 15, is made up of a pair of deep lateral parts 7a connected to the circumferential grooves 3, and a shallow central part 7b having a groove depth less than that of the deep lateral parts 7a and extending between the deep lateral parts 7a.

The shallow central parts 7b provide circumferential support for the blocks 11. This helps to control the heel-and-toe wear. In order to balance the circumferential support and drainage, it is preferable that the depth Ds of each of the deep lateral parts 7a is set to be equal to the depth of the circumferential groove 3 to which the deep lateral part 7a is connected, and the depth Dc of the central part 7b is set in a range of not less than 43%, more preferably not less than 45%, but not more than 58%, more preferably not more than 55% of the depth Ds of the deep lateral parts 7a, and the length L7a of each of the deep lateral parts 7a is set in a range of not less than 50%, preferably not less than 55%, but not more than 70%, preferably not more than 65% of the length L7b of the central part 7b.

The lengths L7a and L7b are measured along the widthwise center line G7 of the axial groove 7.

Incidentally, it is preferable that, between the deep lateral parts 7a and shallow central part 7b, the groove bottom is rounded by a curved surface.

It is preferable that the minor straight segment 15b of the sipe 15 is formed within a supported region P whose axial extent corresponds to or completely overlap with the axial extent of the shallow central part 7b of the axial groove 7. The decrease in the block rigidity due to the zigzag sipe 15 becomes most in a region V around the minor straight segment 15b, therefore, this region V is overlapped in the tire axial direction with the central parts 7b which can compensate the rigidity. Thus, deformation in the region V is controlled to prevent local wear.

The axial width E of the transverse block edge 16 of the block 11 is preferably set in a range of not less than 0.7 times, more preferably not less than 0.75 times, but not more than 1.0 times, more preferably not more than 0.95 times the maximum block width (B).

If less than 0.7 times the maximum block width (B), the block rigidity is decreased near the transverse block edges 16, and the heel-and-toe wear increases. If more than 1.0 times the width (B), the angle θt of the circumferential groove 3 with respect to the tire circumferential direction becomes small, the axial edge component of the circumferential groove 3 which can improve the traction performance is decreased.

The transverse block edges 16 may be parallel with the tire axial direction, but in this embodiment they are inclined with respect to the tire axial direction so that the transverse block edges 16 include a certain degree of circumferential component to provide good wet traction during cornering in addition to straight running.

The angles αy of the transverse block edges 16 are set in a range of not less than 3 degrees, preferably not less than 5 degrees, but not more than 35 degrees, preferably not more than 30 degrees with respect to the tire axial direction.

If the angle αy is more than 35 degrees, there is a tendency that uneven wear occurs near the transverse block edge 16.

The transverse block edges 16 may be a gentle curved line such as arc and/or a zigzag line with a small zigzag amplitude. But, in this embodiment, all of the transverse block edges 16 are straight.

As shown in FIG. 4, acute-angled corners 11x and 11y of the block 11 are preferably chamfered so as to form a triangular chamfer (m) in order to avoid chipping-off of the block and becoming a start point of the heel-and-toe wear.

Comparison Tests

Truck/bus tires of size 295/80R22.5 (rim size: 8.25×22.5) having the tread pattern shown in FIG. 1 and specifications shown in Table 1 were prepared and tested for the resistance to heel-and-toe wear and wet traction.

Excepting the specifications shown in Table 1, all of the test tires had same structure and same specifications as follows.

Tread width TW: 263 mm width Wt5 and Wt6 of Middle and shoulder circumferential grooves: 7.5-9.0 mm Depth Dt5 and Dt6 of Middle and shoulder circumferential grooves: 23.4 mm Width Wt4 of Crown circumferential groove: 4.4 mm Depth Dt4 of Crown circumferential groove: 17.6 mm Width Wy of Axial grooves: 9.0-11.0 mm Depth Ds of deep lateral parts of axial groove: 23.0 to 24.0 mm Ratio Dc/Ds of Depth Ds and Depth Dc of shallow central part: 0.49-0.51

Axial distance L2 between Middle circumferential groove and Tire equator: 13-17% of TW Axial distance L3 between shoulder circumferential groove and Tread edge: 17-19% of TW Angles θt of Circumferential grooves: 7-15 degrees Angles θs of Major straight segments of Sipe: 17 degrees <Heel-and-Toe Wear Resistance Test>

The test tires were mounted on the drive wheels of a truck (2DD-wheel-type tractor, displacement 12000 cc) and run for 20000 km. Then, the heel-and-toe wear was measured on the middle blocks as the difference in the amount of wear between the toe side edge and heel side edge of the block. (Tire pressure: 850 kPa)

<Wet Traction Test>

On a straight concrete road covered with water of 1-3 mm depth the above-mentioned truck was started at full throttle from zero speed, and the time required to travel 40 m was measured. The vertical load of the test tires was 50% of the maximum load specified in ETRTO.

The results are indicated in Table 1 as the reciprocal number of the time by an index based on comparative example 1 being 100. Thus, the larger the index number, the shorter the time, therefore, the better the wet traction.

TABLE 1

| Tire | Ref. 1 | Ref. 2 | Ref. 3 | Ref. 4 | Ex. 1 | Ex. 2 | Ex. 3 |
| --- | --- | --- | --- | --- | --- | --- | --- |
| A/B | 0.7 | 0.8 | 1.7 | 2.0 | 1.2 | 1.2 | 1.2 |
| L4/A (%) | 8 | 8 | 8 | 8 | 10 | 17 | 35 |
| Dp/Dt (%) | 8 | 8 | 8 | 8 | 8 | 8 | 8 |
| angle θc (deg) | 45 | 45 | 45 | 45 | 45 | 45 | 45 |
| E/B | 0.65 | 0.65 | 0.65 | 0.65 | 0.65 | 0.65 | 0.65 |
| Heel-and-toe wear (mm) | 1.6 | 1.5 | 1.5 | 1.7 | 1.1 | 1.3 | 1.3 |
| Wet traction | 100 | 100 | 98 | 95 | 100 | 100 | 99 |

TABLE 1-continued

| Tire | Ex. 4 | Ex. 5 | Ex. 6 | Ex. 7 | Ex. 8 | Ex. 9 | Ex. 10 |
|---|---|---|---|---|---|---|---|
| A/B | 1.2 | 1.2 | 1.2 | 1.2 | 1.2 | 1.2 | 1.2 |
| L4/A (%) | 23 | 23 | 23 | 23 | 23 | 23 | 23 |
| Dp/Dt (%) | 12 | 25 | 20 | 20 | 20 | 20 | 20 |
| angle θc (deg) | 45 | 45 | 70 | 60 | 60 | 60 | 60 |
| E/B | 0.65 | 0.65 | 0.65 | 0.70 | 0.80 | 0.90 | 1.0 |
| Heel-and-toe wear (mm) | 1.0 | 1.1 | 0.8 | 0.7 | 0.6 | 0.7 | 1.0 |
| Wet traction | 103 | 103 | 102 | 105 | 105 | 104 | 102 |

From the test results, it was confirmed that the heel-and-toe wear resistance and the wet traction can be improved.

The invention claimed is:

1. A heavy duty tire comprising
a tread portion provided with a plurality of blocks axially divided by a crown circumferential groove extending along a tire equator, a pair of middle circumferential grooves disposed one on each side of the tire equator, and a pair of shoulder circumferential grooves disposed axially outside the respective middle circumferential grooves,
each block of said plurality of blocks is provided in a ground contact surface thereof with a single zigzag sipe, wherein
a ratio A/B of a block length (A) which is a circumferential length of each said block measured along a straight line passing through a centroid of the ground contact surface to a maximum block width (B) which is an axial distance between axial extreme ends of the ground contact surface is 0.8 to 1.7,
said zigzag sipe is disposed within a central region which is defined as extending from the centroid of the ground contact surface towards each side in a tire circumferential direction by 25% of the block length (A),
said zigzag sipe is composed of a pair of major straight segments extending axially inwardly from both sides of in a tire axial direction of the block, and a minor straight segment extending between inner ends of the respective major straight segments, so that the circumferential distance between circumferential extreme ends of the sipe is in a range of from 10 to 35% of the block length (A),
said plurality of blocks includes middle blocks between the middle circumferential grooves and the shoulder circumferential grooves, and crown blocks between the crown circumferential groove and the middle circumferential grooves,
each of the middle blocks has transverse block edges each having a straight configuration, an axially outer longitudinal block edge having an axially outwardly convexed V-shaped configuration, and an axially inner longitudinal block edge having an axially inwardly convexed V-shaped configuration,
each of the middle blocks is provided with said single zigzag sipe,
each of the crown blocks has transverse block edges having a straight configuration, an axially outer longitudinal block edge having an axially outwardly convexed V-shaped configuration, and the axially inner longitudinal block edge having a crank-shaped configuration defined by two parallel straight segments and one shorter straight segment therebetween,
each of the crown blocks is provided with said single zigzag sipe, and
a depth of each said zigzag sipe is in a range of from 10% to 30% of a maximum depth of the circumferential grooves adjacent to the sipe.

2. The heavy duty tire according to claim 1, wherein the middle circumferential grooves and the shoulder circumferential grooves have a depth is in a range of from 18 to 25 mm.

3. The heavy duty tire according to claim 1, wherein the zigzag sipe has a Z-shaped configuration where the major straight segments are parallel with each other, and an angle between the minor straight segment and the major straight segments is in a range of from 50 to 70 degrees.

4. The heavy duty tire according to claim 1, wherein said transverse block edges of the respective middle blocks and crown blocks each have an axial width of not less than 0.7 times the maximum block width (B).

5. The heavy duty tire according to claim 1, wherein two axial grooves defining each said block with the zigzag sipe are each made up of a pair of deep lateral parts and a shallow central part therebetween, and
the minor straight segment of the zigzag sipe is disposed within a region whose axial extent corresponds to that of the shallow central part.

* * * * *